G. E. MILLS.
Ore Amalgamator.
No. 28,885. Patented June 26, 1860.
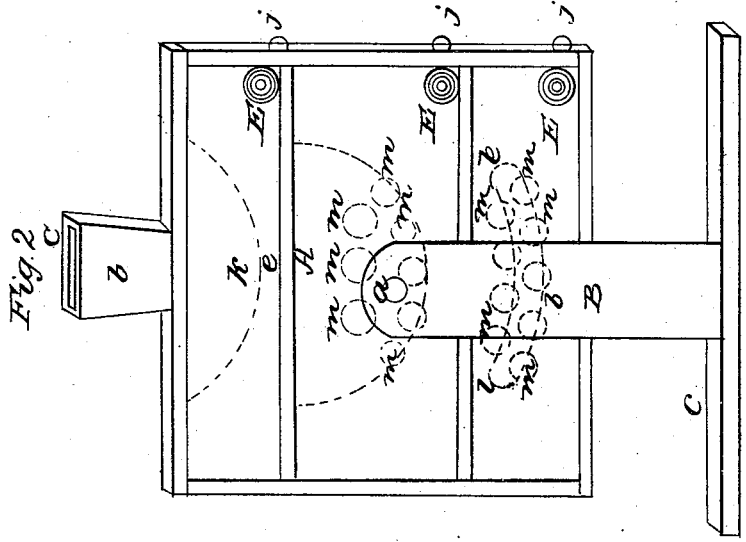
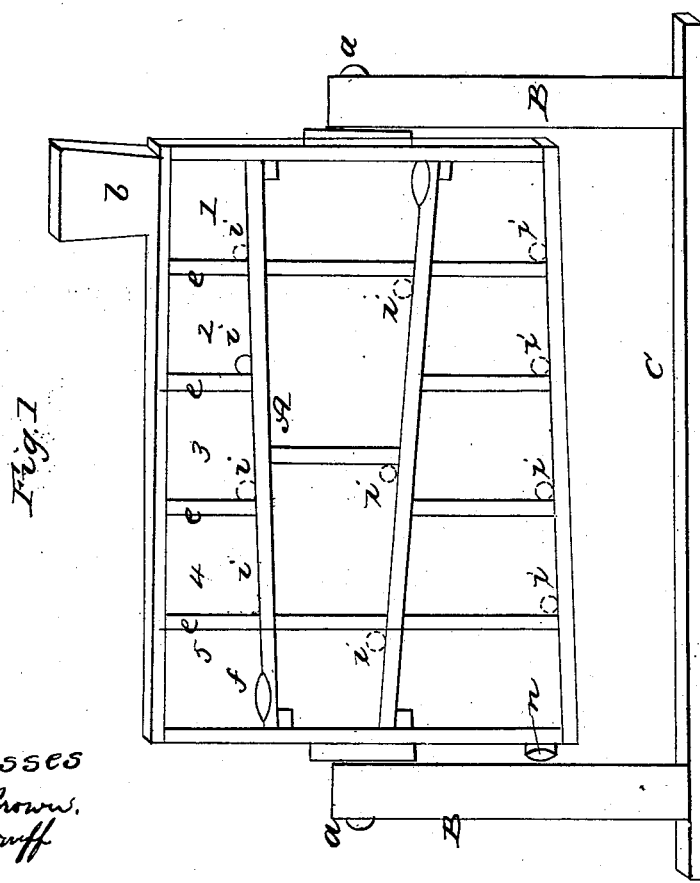
Witnesses
Edw. F. Brown.
J. B. Woodruff
Inventor
George E. Mills

UNITED STATES PATENT OFFICE.

GEO. E. MILLS, OF NEW YORK, N. Y.

AMALGAMATOR.

Specification of Letters Patent No. 28,885, dated June 26, 1860.

*To all whom it may concern:*

Be it known that I, GEORGE E. MILLS, of the city and county of New York, in the State of New York, have invented new and useful Improvements in Gold and Silver Amalgamators; and the following is a full and exact description thereof, reference being had to the accompanying drawings and the letters marked thereon.

The nature of my invention consists in having a series of floors in a box, a little inclined reversely, one above the other, extending longitudinally from end to end, with cross partitions, so shaped with curves and holes as to form dams, to retain the quicksilver and minerals in the several compartments, while the water and dirt readily flow off.

To enable others skilled in the art, to make and use my invention, I will proceed to describe it in detail, referring to the drawings.

Figure 1, is a side elevation, the side removed to show the interior arrangements; Fig. 2 is an end view showing the dams in dotted lines variously constructed to allow the water to flow over and through while the minerals are retained.

The rocker (A,) hangs on pivots (*a, a,*) at about the center of each end, being supported on two posts (B, B,) standing on the plank (C,) on the top, and near the most elevated end of the rocker (A,) is an elevated hopper (*b*,) in which is a riddle (*c*,) which admits the finer portions of the materials and the water into the top section (1st,) where it is agitated till it is forced over the first partition or dam (*e*) on its continuous course into the section (2d,) and so on through the whole series of the first floor when it flows down through the aperture (*f*,) to the next floor. There the compartments being larger admit of a larger quantity being retained, and there being less motion on the center admits of thoroughly securing the dust and finer particles. In the upper floor or first series, (1, 2, 3, &c.,) the openings in the partition are a semicircle to allow the ready flow of water and the finer particles; in the second and farther series the partitions or dams are so constructed with holes and circles that they break the flow of water, while they prevent the quicksilver from breaking, or escaping from one section to another, until the amalgam is drawn off. Each partition, or dam, throughout the whole series, fills up the space between the floors, except for the flow of water and the worthless particles.

(E, E, E,) are movable balls or substances, confined within the compartments, which help to mix the quicksilver with the ores and greatly facilitate the amalgamation.

The holes, (*i, i, i*,) in each separate compartment, are to draw off the minerals when sufficiently amalgamated. They may be stopped by plugs (*j, j, j,*) or supplied with spigots.

It will readily be observed, that by my arrangement, having a series of compartments, the mercury is subdivided into small quantities, and will more readily come in contact with every particle of the ores, while the shape of the partitions filling up the space between the floors, will not allow the heavier portions to change their places, while the lower places or circles (*k*,) in the center of the partitions, and the curved holes (*l*,) and the small round holes (*m*,) will admit the water, and lighter particles to pass off and be discharged at the spout (*n*) at the bottom.

To this form of amalgamators any amount of oscillation may be given required, and it can be operated with little power whether there is a large or small quantity of minerals under process.

Having thus fully described my invention what I claim as new, and desire to secure by Letters Patent, is—

A series of floors; inclined reversely, one above another, in combination with the several dams and compartments to retain the minerals, as described, and for the purposes specified.

GEORGE E. MILLS.

Witnesses:
EDM. F. BROWN,
J. B. WOODRUFF.